US011934613B1

(12) United States Patent
Reed et al.

(10) Patent No.: US 11,934,613 B1
(45) Date of Patent: *Mar. 19, 2024

(54) SYSTEMS AND METHODS FOR GENERATING A POSITION BASED USER INTERFACE

(71) Applicant: Wells Fargo Bank, N.A., San Francisco, CA (US)

(72) Inventors: Glenn Alan Reed, Long Beach, CA (US); Jonathan George Velline, Oakland, CA (US); Alicia Yi-Ping Moore, San Ramon, CA (US); Elizabeth Schrag, Walnut Creek, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/537,261

(22) Filed: Nov. 29, 2021

Related U.S. Application Data

(63) Continuation of application No. 16/204,939, filed on Nov. 29, 2018, now Pat. No. 11,188,218, which is a
(Continued)

(51) Int. Cl.
*G06F 3/041* (2006.01)
*G06F 3/0488* (2022.01)
(Continued)

(52) U.S. Cl.
CPC .......... *G06F 3/0418* (2013.01); *G06F 3/0416* (2013.01); *G06F 3/0488* (2013.01); *G07D 11/60* (2019.01); *G07F 19/20* (2013.01)

(58) Field of Classification Search
CPC .. G06F 3/0418; G06F 3/04816; G06F 3/0488; G07D 11/60; G07F 19/20–211; G09G 2320/0261; G06V 40/16–179
See application file for complete search history.

(56) References Cited

U.S. PATENT DOCUMENTS 6,573,884 B1  6/2003  Kinzie
7,392,937 B1  7/2008  Green et al.
(Continued)

OTHER PUBLICATIONS

Harlev, Ron. 'Detect if a web, drop-down menu is going to display off screen'. In Stage Overflow [online]. Jun. 21, 2010 [retrieved on Jul. 15, 2021] Retrieved from the Internet:<URL: https://stackoverflow.com/questions/3087122/detect-if-a-web-drop-down-menu-is-going-to-display-off-screen>. (Year: 2010).
(Continued)

*Primary Examiner* — David S Posigian
(74) *Attorney, Agent, or Firm* — Foley & Lardner LLP

(57) ABSTRACT

A method for generating an adaptive user interface may include, generating a graphical user interface for presentation to a user at an automated banking machine that includes a touch screen display and a currency note dispenser. The automated banking machine may include a sensor that senses information indicating a physical disposition of the user relative to the automated banking machine. The method may include adjusting the placement of the menu options on the touch screen display based on the information regarding the physical disposition of the user relative to the automated banking machine.

20 Claims, 7 Drawing Sheets

Related U.S. Application Data continuation of application No. 13/441,151, filed on Apr. 6, 2012, now Pat. No. 10,146,423.

(60) Provisional application No. 61/473,101, filed on Apr. 7, 2011.

(51) Int. Cl.
  G07D 11/60   (2019.01)
  G07F 19/00   (2006.01)

(56) References Cited

U.S. PATENT DOCUMENTS

| | | |
|---|---|---|
| 7,419,091 B1 | 9/2008 | Scanlon |
| 7,644,039 B1 | 1/2010 | Magee et al. |
| 2002/0070926 A1 | 6/2002 | Kavanagh |
| 2002/0191026 A1* | 12/2002 | Rodden ............... G09G 5/14 |
| | | 715/779 |
| 2004/0130576 A1 | 7/2004 | Fujita et al. |
| 2005/0132302 A1 | 6/2005 | Cina |
| 2007/0008300 A1 | 1/2007 | Yang et al. |
| 2007/0247435 A1 | 10/2007 | Benko et al. |
| 2007/0257891 A1 | 11/2007 | Esenther et al. |
| 2007/0279485 A1 | 12/2007 | Ohba et al. |
| 2008/0163053 A1 | 7/2008 | Hwang et al. |
| 2009/0164936 A1* | 6/2009 | Kawaguchi ........... G06F 3/0481 |
| | | 715/788 |
| 2009/0199128 A1 | 8/2009 | Matthews et al. |
| 2009/0295832 A1 | 12/2009 | Takatsuka |
| 2009/0327963 A1* | 12/2009 | Mouilleseaux ..... G06F 3/04883 |
| | | 715/834 |
| 2010/0079405 A1 | 4/2010 | Bernstein |
| 2010/0100849 A1 | 4/2010 | Fram |
| 2010/0188342 A1* | 7/2010 | Dunn ................. G06F 3/04886 |
| | | 715/810 |
| 2011/0001762 A1 | 1/2011 | Li et al. |
| 2011/0164063 A1 | 7/2011 | Shimotani et al. |
| 2012/0032896 A1 | 2/2012 | Vesely et al. |
| 2013/0091464 A1 | 4/2013 | Chang et al. |

OTHER PUBLICATIONS

Migge et al., "User Model for Predictive Calibration Control on Interactive Screens", 2010 International Conference on Cyberworlds [online]Oct. 20-22, 2010 [retrieved on Oct. 4, 2013], Retrieved from Internet, http://ieeexplore.ieee.org/xpo/article Details.jsp?amumber-5657*tag-1>, 6 pages. (Year: 2010).

* cited by examiner

SYSTEMS AND METHODS FOR GENERATING A POSITION BASED USER INTERFACE

CROSS-REFERENCE TO RELATED APPLICATIONS

This application is a continuation of and claims priority to U.S. patent application Ser. No. 16/204,939, filed Nov. 29, 2018, which is a continuation of and claims priority to U.S. patent application Ser. No. 13/441,151, filed Apr. 6, 2012, now U.S. Pat. No. 10,146,423 issued Dec. 4, 2018, which claims the benefit of and priority to U.S. Provisional Patent Application No. 61/473,101, filed Apr. 7, 2011, the contents of all of which are hereby incorporated by reference herein in their entireties for all purposes.

BACKGROUND

Transaction cards such as debit, credit or stored value cards are often used by account holders to purchase items or services or to obtain funds. Account holders often prefer the convenience, for example, of visiting an automated teller machine (ATM) or other automated banking machine over walking into a bank branch to obtain cash. Such cards provide account holders with round the clock access to banking services such as withdrawing funds, depositing funds, and transferring funds.

SUMMARY

An embodiment of a method for generating an adaptive user interface may include, generating a graphical user interface for presentation to a user at an automated banking machine that includes a touch screen display and a currency note dispenser. The automated banking machine may include a sensor that senses information indicating a physical disposition of the user relative to the automated banking machine. The method may include adjusting the placement of the menu options on the touch screen display based on the information regarding the physical disposition of the user relative to the automated teller machine.

An embodiment of an automated banking machine can include a currency note dispenser, display device and a sensor configured to generate information regarding a physical location of the user relative to the automated banking machine. The automated banking machine can include a user interface logic configured to adjust the placement of the menu options on the display device based on the information regarding the physical disposition of the user relative to the automated banking machine.

An embodiment of an automated banking machine can include a touch screen display configured to sense a user's touch, the touch screen display configured to display menu options to a user. The automated banking machine can include a user interface logic configured to receive information regarding a location of the user touch from the touch screen display and to adjust placement of the menu options on the touch screen display based on the location of the user touch. The user interface logic may adjust the horizontal placement of the menu options being based upon a horizontal position of the user touch and the vertical placement of the menu options based on a vertical position of the user touch.

DETAILED DESCRIPTION OF EXAMPLE EMBODIMENTS

Figure 1:
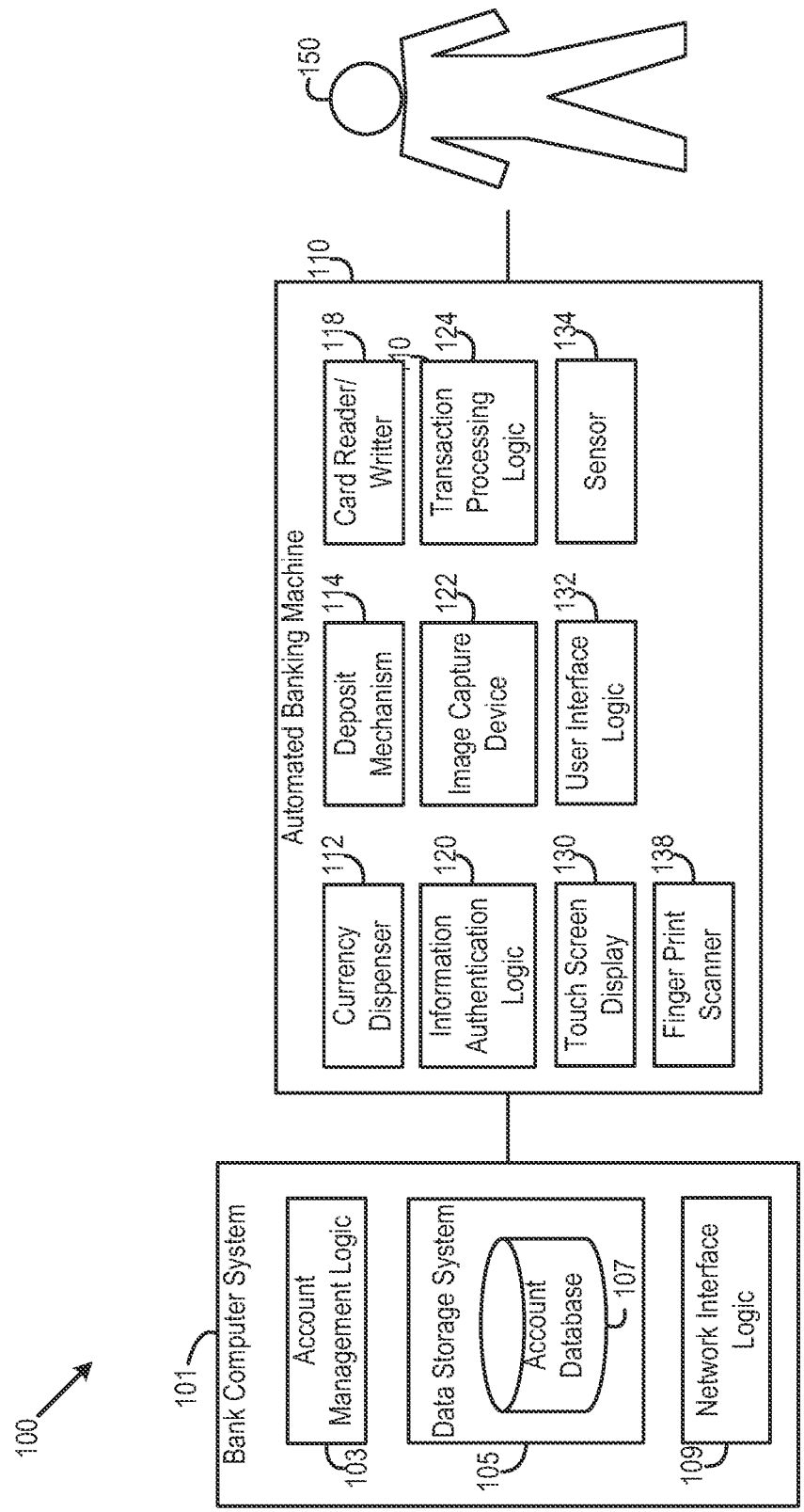
FIG. 1 is a schematic diagram of an automated banking machine that communicates with a banking computer system.

Referring to FIG. 1, FIG. 1 shows a system 100 according to an example embodiment. The system 100 may include a bank computer system 101 that may include, among other systems, account management logic 103, data storage system 105 and network interface logic 109. The system 100 may also include an automated banking machine 110, such as an automated teller machine (ATM). The system 100 may be accessed by an account holder 150 who seeks authorization for a financial transaction.

In an example embodiment, the bank computer system 101 may be provided or controlled by a bank or other financial institution, and the users may be the customers or account holders of the financial institution. The users may access the system 101 through tellers at retail bank branches, through the Internet, or through an automated banking machine. In FIG. 1, for example, a customer 150 is shown accessing system 101 through an automated banking machine 110.

In the example where system 100 is provided by a financial institution, account management logic 103 may further include stored program logic that performs various tasks in connection with accounts held by account holders at the financial institution, such as account processing (processing of account debits and credits), authentication, statement generation, account status, funds transfers, and so on. In practice, the bank computer system 101 may include server computing systems, for example, comprising one or more networked computer servers having non-transitory machine readable media. The logic or logics described herein may therefore be implemented as program logic that is stored on the non-transitory machine-readable storage media and that, when executed by the server(s), causes the servers to perform the operations described herein. The account management logic 103 may store data related to the account in data storage system 105.

The data storage system 105 may include an account database 107. The account database 107 may be configured to store a log of each transaction performed by the account management logic 103. The account database 107 may be configured store other information such as account balance and other account holder related information, such as, preferences, profiles, and so on.

Network interface logic 109 may be used to connect the bank computer system 101 to communicate with other systems such as the automated banking machine 110. An embodiment of the network interface logic 109 may be configured to communicate with the automated banking machine 110 over a proprietary encrypted network. Another embodiment of the network interface logic 109 may be configured to communicate with the automated banking machine 110 over a public encrypted network. In other embodiments, the network interface logic 109 may connect to the Internet to permit account holders to access the bank computer system 101 through an on-line banking area of a website of the bank. Network interface logic 109 may also comprise other logic that is configured to provide an interface for other types of devices such mobile devices that includes cell phones, smart phones, fax machines, and server-based computing systems.

The automatic banking machine 110 may, for example, be an automated teller machine, a point of sale device, or other device. For example, in the case of an automated teller machine, automatic banking machine 110 may include a currency dispenser 112, deposit mechanism 114, card reader/writer 118, information authentication logic 120, image capture device 122, transaction processing logic 124, user interface logic 132, touch screen display 130, sensor 134, and finger print scanner 138. In the case of a point of sale device, the automated banking machine 110 may include a touch screen display 130 and sensor 134. Other hardware may also be included, such as a keypad or buttons for receiving user inputs. The point of sale device may, for example, be a self checkout system used at a merchant to pay for goods or services that are being purchased. Such a banking transaction at a point of sale may permit, for example, funds to be automatically transferred to the merchant from a checking or credit card account of the account holder to pay for the goods or services.

The currency dispenser 112 may dispense currency notes ("cash") to an account holder 150 from their financial institution accounts. The currency dispenser 112 may be configured to dispense currency in various denominations, as specified by the account holder. The deposit mechanism 114 accepts envelop or envelop-free deposits of cash or checks. One example embodiment of the deposit mechanism 114 may include a scanner capable of scanning images from a various papers placed in the deposit mechanism 114.

The card reader/writer 118 scans information from the magnetic stripe ("magstripe") of a transaction card. The card reader/writer 118 may be configured to read information from a credit card, debit card, ATM card, stored value card, or the like. While performing the read operation the card reader/writer 118 may be configured to read the account information and the PIN associated with the card and the account. In an example embodiment, the card reader/writer 118 may also be configured to perform write operations.

The information authentication logic 120 may authenticate information received by the automated banking machine 110 to approve or reject a transaction. The information authentication logic 120 may approve or deny authentication for transaction data received by automated banking machine 110. The information authentication logic 120 authenticates a user as being a valid account holder associated with the transaction card and the corresponding account at the financial institution.

The image capture device 122 may capture an image outside the automated banking machine 110. For example, the image capture device 122 may be used in part for security purposes, i.e., to capture an image of a person conducting a transaction in case the transaction later turns out to be fraudulent. The image capture device 122 may include a single camera or multiple cameras. In one embodiment, the image capture device 122 may be configured to identify features of a person who is front of the automated banking machine 110. For example, the image capture device 122 may be configured to identify the nose, eyes, mouth and ears and, based on this information, pinpoint the center of an individual's face. Another embodiment of the image capture device 122 may include two cameras, e.g., to provide depth perception.

The transaction processing logic 124 may be configured to process each transaction requested by the account holder. For example, the transaction processing logic 124 may cooperate with the account management logic 103 at the bank computer system 101 to ensure that transactions are properly debited/credit to the account of the account holder.

The touch screen display 130 may allow the customer or account holder 150 to interact with the automated banking machine 110 in order to process transactions. The touch screen may utilize resistive, capacitive, surface acoustic wave, infrared, optical imaging, dispersive signal, acoustic pulse recognition, or other touch sensing technology. The transactions may include withdrawing funds, purchasing one or more goods or services, transferring funds from one account to another account, and so on. The touch screen display 130 may be used to display various menu options relating to such transactions to the account holder.

In an example embodiment, the touch screen display 130 may is a screen display that is sufficiently large that the placement of the menu options on the screen display impacts the ability of the user to reach the menu options. For example, the screen may have a diagonal size of about 13, 15, 19, 22, 24, 27, 32, 42, 46 or 52 inches. Other sizes are also possible.

The user interface logic 132 generates a graphical user interface for presentation to a user at the automated banking machine 110 via the touch screen display 130. As explained in greater detail below in connection with FIGS. 2-6, the user interface logic 132 receives information indicating a physical disposition of the user relative to the automated banking machine and, based on this information, adjusts placement of menu options on the touch screen display to accommodate the user's position. The information regarding the physical disposition of the user relative to the automated banking machine is sensed by a sensor. The sensor may be the touch screen display 130, the image capture device 122, and/or a separate sensor 134. For example, the location of the menu may be based on the initial placement of the user's finger as sensed by the touch screen display 132. As another example, the location of the menu may be based on a detected position of the user as sensed by the image capture device 122. As another example, the location of the menu may be based on a detected position of the user's automobile as detected by the sensor 134. In this embodiment, for example, the sensor may comprise one or more proximity sensors located in the path of the drive thru that detects the position of the automobile along the path of the drive thru. As another example, the user interface logic 132 may place the menu based on a plurality of fingers that touched the touch screen display 130. As another example, the user interface logic 132 may be configured to allow a user to move the entire or portions of the menu choices displayed. Other types of sensors may also be used, such as infrared, camera, laser or the like. As another example, the sensor 134 may sense the height of the vehicle relative to the automated banking machine 110 and adjust the vertical positioning of the menu accordingly. Other configurations are also possible, some of which are described below.

By sensing the physical disposition of the user relative to the automated banking machine and adjusting placement of menu options on the touch screen display, the user interface logic is able to accommodate the physical disposition of the user. For example, in the context of a drive thru arrangement in which the account holder remains seated in an automobile during their transaction, the account holder may accidentally pull too far forward to conveniently reach the left side of the screen. Alternatively, an individual sitting in the cab of a truck may have difficulty reaching a bottom portion of the screen. Likewise, a person in a wheel chair or with other physical disabilities may have difficulties reaching certain portions of the screen. The user interface logic 132 is configured to adjust placement of menu options to accommodate the variations in the ability of account holders to reach the touch screen display.

Figure 2:
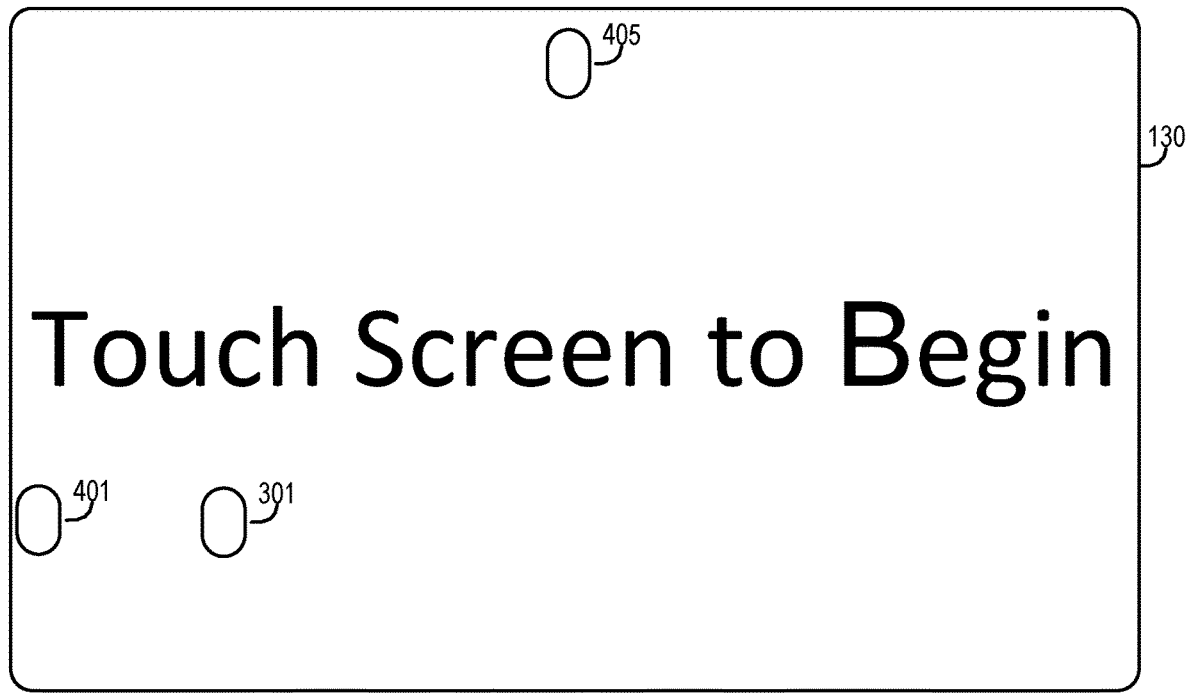
FIG. 2 is a display screen that may be generated by the automated banking machine of FIG. 1.

Referring to FIG. 2, FIG. 2 shows a touch screen display 130 that may be part of an automated banking machine 110. When the automated banking machine 110 is not in use by a particular account holder, it may display a generic welcome message, such as "touch screen to begin," as shown. Other content such as a financial institution logo, advertising, and so on, may also be displayed. For purposes of providing examples, FIG. 2 also shows regions 301, 401 and 501, which for example may each be where particular account holders have just touched the display 130 in different examples.

Figure 3:
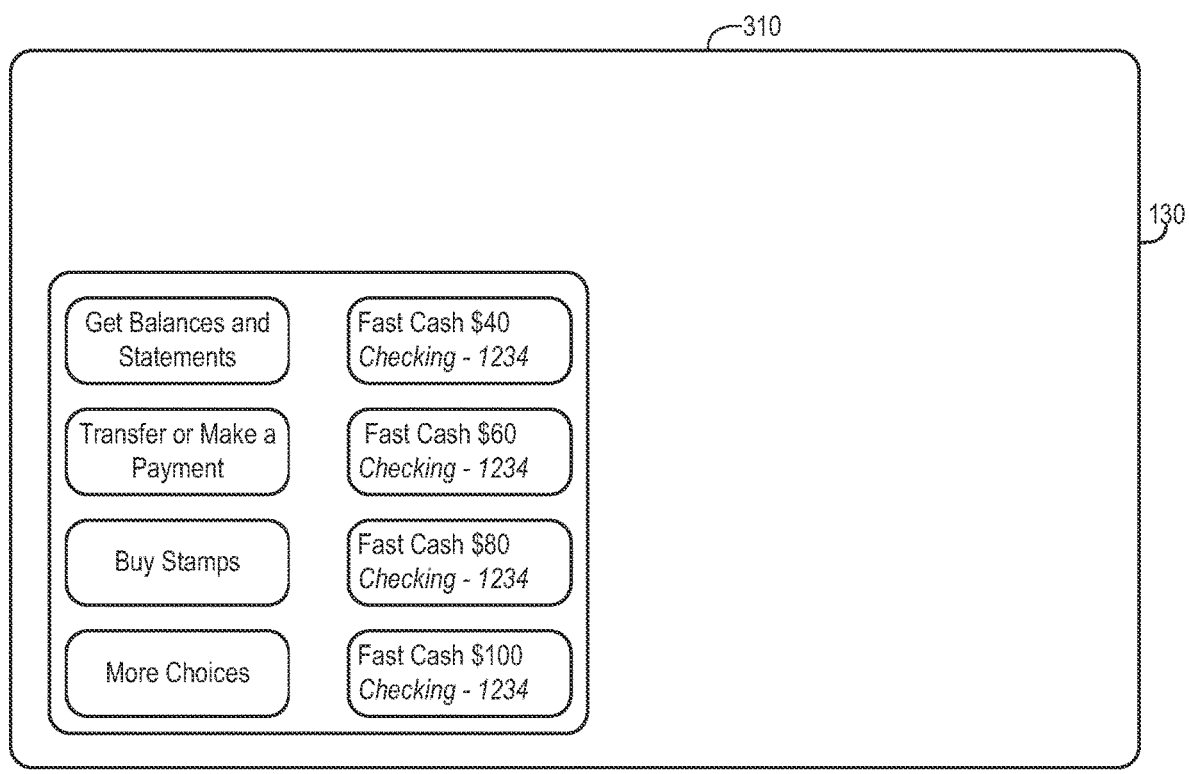
FIGS. 3-4 are display screens with a menu that is presented after the user's touch in FIG. 2.

Referring to FIG. 3, FIG. 3 shows a screen display that includes a menu 310 that is displayed as a result of the user touch 301 in FIG. 2. As shown in FIG. 3, the menu is positioned in the lower left hand corner, corresponding to the fact that the user touched the screen in the lower left hand corner in FIG. 2. It is thus seen that the horizontal and vertical placement of the menu options may one or both be adjusted based upon the horizontal and vertical position, respectively, of the user touch. Depending on the location of the touch (and how close it is to the edge of the screen) the menu may be centered around the location of the touch or may simply be in the same general region as the touch (as in FIG. 3). The placement of other content may then be adjusted accordingly. For example, advertising content on the touch screen display may be placed in a portion of the touch screen display not occupied by the menu options. Other content such as a financial institution logo, instructions and other information content, and so on, may also be displayed.

After adjusting the placement of menu options on the touch screen display, the user interface logic 132 may be configured to monitor whether the user the touches the touch screen display within a predetermined period of time. For example, if for some reason the positioning of the menu options was not performed correctly, the user may not be able to reach the menu options. Thus, for example, if the user interface logic 132 determines that the user has not touched the touch screen display within a predetermined period of time then, in response, the user interface logic 132 may readjust placement of menu options on the touch screen display to a default placement.

Figure 4:
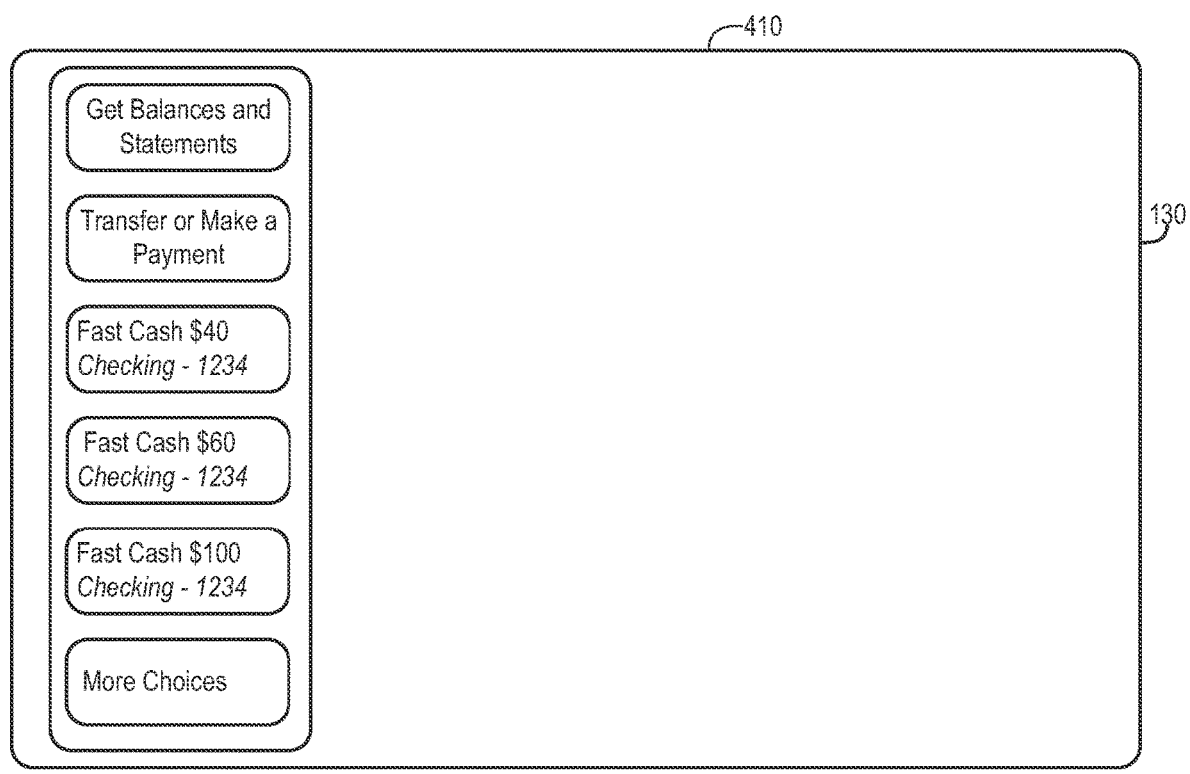

Referring to FIG. 4, FIG. 4 shows a screen display that includes a menu 410 that is displayed as a result of the user touch 401 in FIG. 2. In FIG. 4, the user interface logic 132 has made a determination to place the menu options in a vertical column extending along a left side of the touch screen display. Such a determination may have been made, for example, because the user touched a far left portion of the screen. Likewise, for the user touch 405 in FIG. 2, the user interface logic 132 may make a determination to place the menu options in a horizontal row across a top of the touch screen display. In other scenarios, the user interface logic 132 may make a determination to place the menu options in a vertical column extending along a right side of the touch screen display 130 or in a horizontal row across a bottom of the touch screen display 130. It may also be noted in FIG. 4 that the overall arrangement of the menu options (including the number of menu options presented) has been adjusted as compared to that shown in FIG. 3.

In one embodiment, the menu may be selectable and movable or otherwise adjustable by the account holder. For example, once the menu is displayed, the user may place a finger at the center of the menu and (without lifting the finger) drag the menu to another location on the touch screen display 130. In one embodiment, the user interface logic 132 may adjust the overall arrangement of the menu option to accommodate the new menu position received from the user. In another embodiment, the dragging may permit the part of the menu to be placed outside the screen display and thus not visible to the user. In another embodiment the user may be limited in the movement of the menu such that the no part of the menu is outside the screen display.

Figure 5:
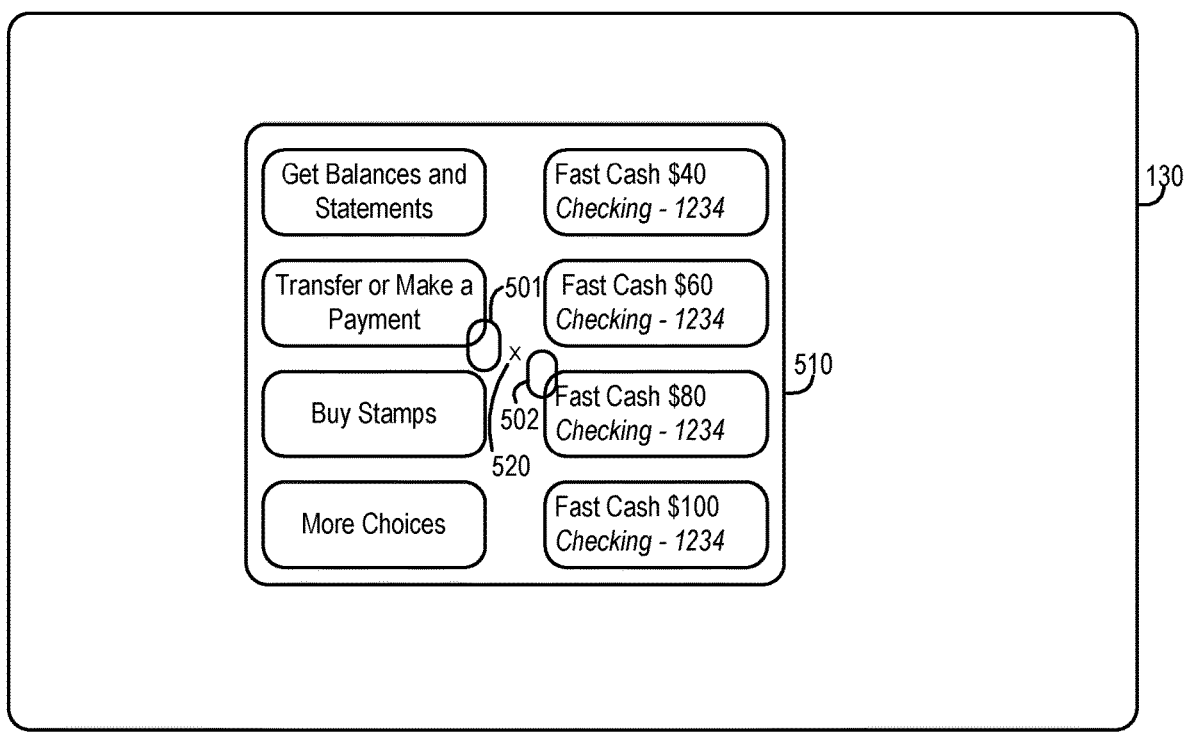
FIG. 5 is a menu that is displayed based on the multiple finger touches by the user.

FIG. 5 shows a menu that is displayed based on the multiple finger touches by the user. An embodiment of the touch screen display 130 may be sensitive to multiple finger touches. In the embodiment shown in FIG. 5, a user may have touched the touch screen display 130 at two different locations, such as, a first touch 501 and a second touch 502. The first touch 501 and second touch 502 are in different locations. The user interface logic 132 may calculate the distance between the first touch 501 and the second touch 502 and determine the vertical and horizontal halfway points between the first touch 501 and the second touch 502. The user interface logic 132 may place the center 320 of the menu 310 at an equal distance from both the first touch 301 and the second touch 302. In another embodiment, the user interface logic 132 may place the center 320 of the menu at one of the touch location instead of the center of both the touch locations.

Figure 6:
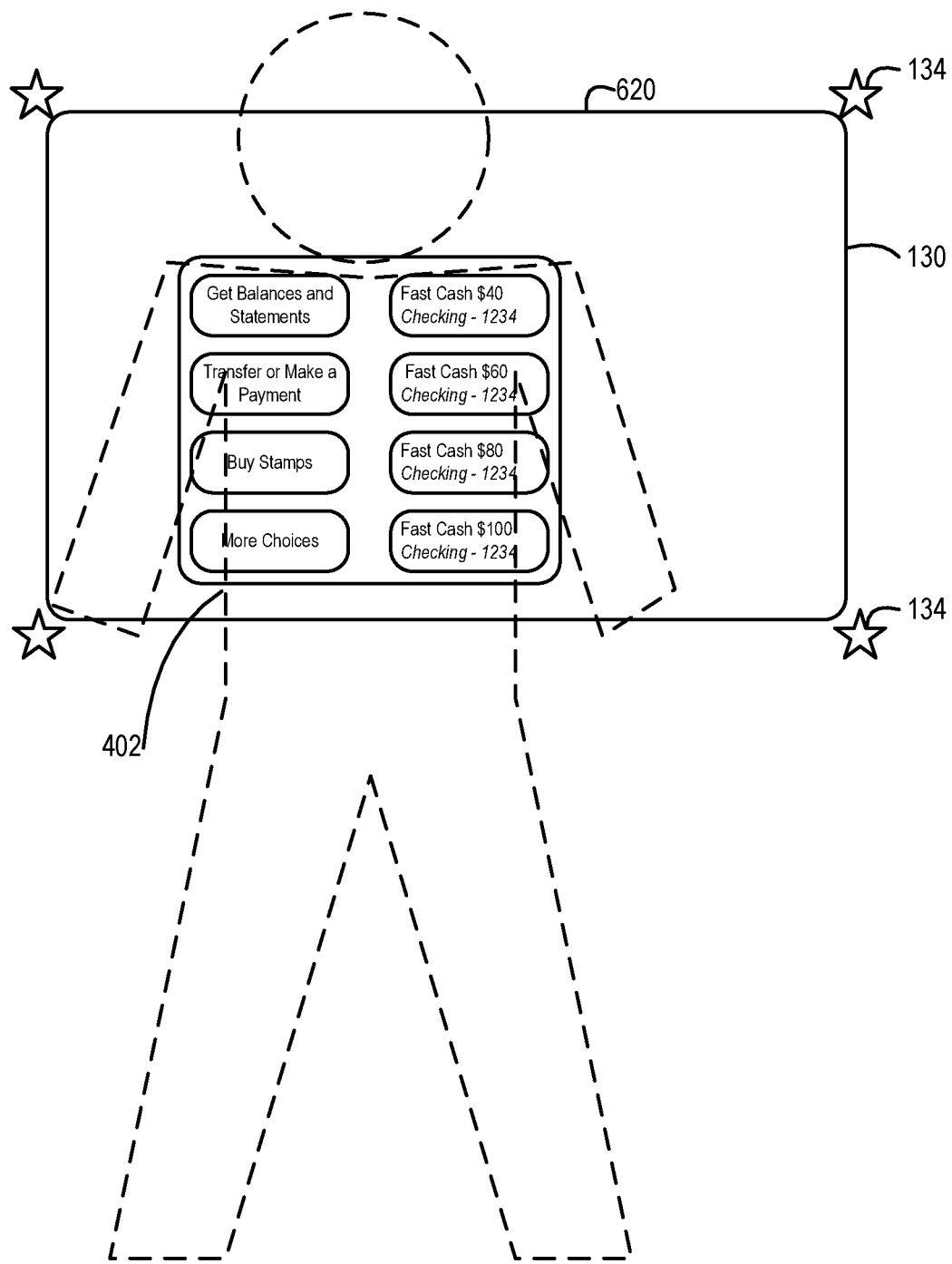
FIG. 6 is a menu that is displayed based on the user's detected position.

FIG. 6 shows a menu 620 that is displayed based on the user's detected position. The user may stand or be in an automobile in front of the automated banking machine 110. Upon detecting the user, the user interface logic 132 may automatically display the menu 620 at a position determined based on the user's height, e.g., at the detected center of the user's torso 402. In another embodiment, the center of the menu may be positioned at or near the center of the user's face. The sensors 134 may be located in various locations of the automated banking machine 110. The cameras in the sensors 134 may detect the user movement and facial features. The sensors 134 may be configured to locate the users facial features, such as, nose, mouth, eyes and ears.

In another embodiment, the sensors 134 may sense the height of the user's automobile and display the menu based on the detected height of the automobile. The sensors 134 may be infrared sensors, video cameras, lasers or the like. In one embodiment, the sensor 134 may provide the position information about the user to the user interface logic 132 to generate the menu 620 at the appropriate location.

Figure 7:
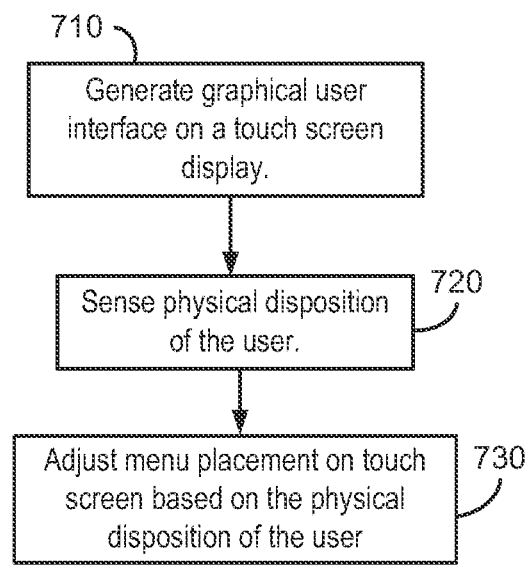
FIG. 7 is a process that may be implemented using the system in FIG. 1.

Referring now to FIG. 7, FIG. 7 is a process that may be implemented using the system in FIG. 1. At step 710, the automated banking machine 110 may generate a graphical user interface on a touch screen display. At step 720, the sensors 134 may detect the physical disposition of the user relative to the automated banking machine 110. Next at step 730, the user interface logic 132 may adjust the menu placement on the touch screen display based on the physical disposition of the user. In other embodiments, in order to detect the physical disposition of the user, the automated banking machine 110 may detect the physical attributes of the user's automobile. The physical attributes may include the height and distance from the automated banking machine 110. In this embodiment, the menu placement may be adjusted based on the disposition of the user's automobile.

The embodiments of the methods and system have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any non-transitory machine-readable storage media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising non-transitory machine-readable storage media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing computers in the form of computers, including a processing unit, a system memory or database, and a system bus that couples various system components including the system memory to the processing unit. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. User interfaces, as described herein may include a computer with monitor, keyboard, a keypad, a mouse, joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention.

Throughout the specification, numerous advantages of the exemplary embodiments have been identified. It will be understood of course that it is possible to employ the teachings herein without necessarily achieving the same advantages. Additionally, although many features have been described in the context of a particular data processing unit, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The invention is not limited to a particular embodiment, but extends to various modifications, combinations, and permutations that nevertheless fall within the scope and spirit of the appended claims.

What is claimed is:

1. A method, comprising:
    generating a graphical user interface for presentation to a user at an automated banking machine having a touch screen display, wherein the graphical user interface comprises a menu including menu options presented at an initial location determined based on a position of a vehicle including the user relative to the automated banking machine;
    determining a location of a face of the user based on an image captured by an image capture device;
    adjusting placement of the menu including the menu options on the touch screen display based on the location of the face of the user and information indicating a physical disposition of the user relative to the automated banking machine;
    receiving, subsequent to adjusting the placement of the menu, a plurality of user touch inputs including a first touch input and a second touch input on the touch screen display;
    determining a halfway point between the first touch input and the second touch input;
    positioning a center of the menu at the halfway point between the first touch input and the second touch input;
    determining, responsive to positioning the center of the menu according to the plurality of user touch inputs, that one or more menu options of the menu are positioned outside of a boundary of the touch screen display when the menu is displayed at the halfway point; and
    adjusting, responsive to determining that the one or more menu options are positioned outside of the boundary based on the plurality of user touch inputs, the center of the menu to a second new menu position, such that the center of the menu is positioned at the second new menu position and no part of the menu is outside the boundary of the touch screen display.

2. The method of claim 1, wherein adjusting the placement of the menu further comprises adjusting horizontal placement of the menu, adjusting vertical placement of the menu, or both.

3. The method of claim 1, wherein determining the location of the face of the user comprises processing image data associated with the image to estimate a position of the user.

4. The method of claim 1, wherein the physical disposition of the user comprises a height of the user.

5. The method of claim 1, wherein determining the physical disposition of the user comprises determining a height of the vehicle.

6. The method of claim 1, further comprising:
    determining that the user has not touched the touch screen display within a predetermined period of time; and
    responsive to determining that the user has not touched the touch screen display within the predetermined period of time, readjusting placement of the menu on the touch screen display to a default placement.

7. The method of claim 1, further comprising adjusting placement of advertising content on the touch screen display based on the information regarding the physical disposition of the user.

8. The method of claim 7, wherein adjusting the placement of the advertising content comprises placing the advertising content in a portion of the touch screen display not occupied by the menu.

9. The method of claim 1, wherein the placement of the menu is readjustable to a default position after a condition occurs.

10. The method of claim 1, wherein a shape of a menu option is adjusted based on the physical disposition of the user.

11. A system, comprising:
    an automated banking machine having a touch screen display; and
    a processing circuit comprising one or more processors coupled to a non-transitory memory, the processing circuit configured to:
        generate a graphical user interface for presentation to a user at the automated banking machine having the touch screen display, wherein the graphical user interface comprises a menu including menu options presented at an initial location determined based on a position of a vehicle including the user relative to the automated banking machine;
        determine a location of a face of the user based on an image captured by an image capture device;
        adjust placement of the menu including the menu options on the touch screen display based on the location of the face of the user and information indicating a physical disposition of the user relative to the automated banking machine;
        receive, subsequent to adjusting the placement of the menu, a plurality of user touch inputs including a first touch input and a second touch input on the touch screen display;
        determine a halfway point between the first touch input and the second touch input;
        position a center of the menu at the halfway point between the first touch input and the second touch input;
        determine, responsive to positioning the center of the menu according to the plurality of user touch inputs, that one or more menu options of the menu are positioned outside of a boundary of the touch screen display when the menu is displayed at the halfway point; and
        adjust, responsive to determining that the one or more menu options are positioned outside of the boundary, the center of the menu to a second new menu position, such that the center of the menu is positioned at the second new menu position and no part of the menu is outside the boundary of the touch screen display.

12. The system of claim 11, wherein the processing circuit is further configured to adjust the placement of the menu based on adjusting horizontal placement of the menu, adjusting vertical placement of the menu, or both.

13. The system of claim 11, wherein the processing circuit is further configured to determine the location of the face of the user based on processing image data associated with the image to estimate a position of the user.

14. The system of claim 11, wherein the physical disposition of the user comprises a height of the user.

15. The system of claim 11, wherein the processing circuit is further configured to determine the physical disposition of the user based on determining a height of the vehicle.

16. The system of claim 11, wherein the processing circuit is further configured to:
   determine that the user has not touched the touch screen display within a predetermined period of time; and
   responsive to determining that the user has not touched the touch screen display within the predetermined period of time, readjust placement of the menu on the touch screen display to a default placement.

17. The system of claim 11, wherein the processing circuit is further configured to adjust placement of advertising content on the touch screen display based on the information regarding the physical disposition of the user.

18. The system of claim 17, wherein the processing circuit is further configured to adjust the placement of the advertising content comprises placing the advertising content in a portion of the touch screen display not occupied by the menu.

19. The system of claim 11, wherein the placement of the menu is readjustable to a default position after a condition occurs, and wherein a shape of menu options is adjusted based at least in part on the physical disposition of the user.

20. A non-transitory computer readable medium storing instructions that, when executed by one or more processors, cause the one or more processors to:
   generate a graphical user interface for presentation to a user at an automated banking machine having a touch screen display, wherein the graphical user interface comprises a menu including menu options presented at an initial location determined based on a position of a vehicle including the user relative to the automated banking machine;
   determine a location of a face of the user based on an image captured by an image capture device;
   adjust placement of the menu including the menu options on the touch screen display based on the location of the face of the user and information indicating a physical disposition of the user relative to the automated banking machine;
   receive, subsequent to adjusting the placement of the menu, a plurality of user touch inputs including a first touch input and a second touch input on the touch screen display;
   determine a halfway point between the first touch input and the second touch input;
   position a center of the menu at the halfway point between the first touch input and the second touch input;
   determine, responsive to positioning the center of the menu according to the plurality of user touch inputs, that one or more menu options of the menu are positioned outside of a boundary of the touch screen display when the menu is displayed at the halfway point; and
   adjust, responsive to determining that the one or more menu options are positioned outside of the boundary, the center of the menu to a second new menu position, such that the center of the menu is positioned at the second new menu position and no part of the menu is outside the boundary of the touch screen display.

\* \* \* \* \*